US011897415B1

(12) United States Patent
Jayakar et al.

(10) Patent No.: US 11,897,415 B1
(45) Date of Patent: Feb. 13, 2024

(54) OCCUPANT RESTRAINT SYSTEM

(71) Applicant: ZF Passive Safety Systems US Inc., Washington, MI (US)

(72) Inventors: Hylus Ranjit Raj Jayakar, Washington Township, MI (US); Wael Youssef-Agha, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/938,997

(22) Filed: Sep. 7, 2022

(51) Int. Cl.
*B60R 22/02* (2006.01)
*B60R 22/18* (2006.01)

(52) U.S. Cl.
CPC ............ *B60R 22/023* (2013.01); *B60R 22/18* (2013.01)

(58) Field of Classification Search
CPC ............ B60R 21/026; B60R 2021/065; B60R 2021/0273; B60R 2021/0253; B60R 2021/01265; B60R 22/023; B60R 22/24; B60R 21/11; B60R 21/12; B60R 2022/1818
USPC ........................... 296/24.4, 24.43; 280/801.1
See application file for complete search history.

(56) References Cited

U.S. PATENT DOCUMENTS

| | | | | |
|---|---|---|---|---|
| 3,385,633 | A * | 5/1968 | Aizley | B60R 22/26 297/484 |
| 6,286,882 | B1 * | 9/2001 | Rastetter | F41H 7/048 296/24.41 |
| 6,565,120 | B2 * | 5/2003 | Ganesan | B60R 22/02 280/801.1 |
| 8,556,324 | B1 * | 10/2013 | Yamamoto | B60N 2/3065 296/65.09 |
| 8,998,283 | B1 * | 4/2015 | Yamamoto | B60R 5/04 280/756 |
| 9,616,844 | B2 * | 4/2017 | Karube | B60R 22/24 |
| 9,873,398 | B2 * | 1/2018 | Mochizuki | B60R 21/12 |
| 10,239,425 | B2 * | 3/2019 | Bryant | B60N 2/30 |
| 2022/0126773 | A1 * | 4/2022 | Yagi | B60R 22/24 |

FOREIGN PATENT DOCUMENTS

EP 2108550 A1 * 10/2009 .......... B60R 22/023

* cited by examiner

*Primary Examiner* — Paul N Dickson
*Assistant Examiner* — Caitlin Anne Miller
(74) *Attorney, Agent, or Firm* — TAROLLI, SUNDHEIM, COVELL & TUMMINO L.L.P.

(57) ABSTRACT

An occupant restraint system for retaining an occupant in a vehicle seat includes a support extending adjacent a back of the vehicle seat so that the back of the vehicle seat extends between the occupant and the support. At least one strap has first and second ends attached to the support. The at least one strap extends around the occupant and the back of the seat so that the back of the vehicle seat and the occupant are between the support and the at least one strap.

15 Claims, 5 Drawing Sheets

US 11,897,415 B1

OCCUPANT RESTRAINT SYSTEM

FIELD OF THE INVENTION

The present invention relates to an occupant restraint system for a vehicle and, more specifically, to an occupant restraint system that expands from a roof of the vehicle.

BACKGROUND TO THE INVENTION

A 3-point seatbelt system for restraining an occupant of a vehicle in the event of a collision is known. A 3-point seatbelt system may include a lap belt section and a shoulder belt section formed from a continuous length of webbing. When an occupant is seated in the vehicle seat, the lap belt section is configured to extend across the occupant's pelvis and the shoulder belt section is configured to extend across the occupant's upper torso. A latch plate attached to the webbing is received by a buckle to allow the seatbelt arrangement to be fastened for enabling restraint and unfastened to allow entrance and egress from the vehicle.

It is also known to provide a vehicle with a 4-point, 5-point, or even 6-point seatbelt system for restraining an occupant in the event of a collision. Although the 4-point/5-point/6-point seatbelt systems may afford greater protection than the 3-point seatbelt system, such seatbelt arrangements are not typically installed in passenger vehicles because of a perceived decrease in occupant comfort and convenience.

It is desired to provide a vehicle safety system that provides the greater protection that may be afforded by 4-point/5-point/6-point seatbelt arrangements while still retaining the occupant comfort and convenience that consumers associate with 3-point seatbelt arrangements.

SUMMARY OF THE INVENTION

According to one aspect of the invention, an occupant restraint system for retaining an occupant in a vehicle seat includes a support extending adjacent a back of the vehicle seat so that the back of the vehicle seat extends between the occupant and the support. At least one strap has first and second ends attached to the support. The at least one strap extends around the occupant and the back of the seat so that the back of the vehicle seat and the occupant are between the support and the at least one strap.

According to another aspect of the invention, the support extends along a longitudinal axis from a first end to a second end. The at least one strap extends diagonally to the longitudinal axis.

According to another aspect of the invention, the support extends along a longitudinal axis from a first end to a second end. The at least one strap extends perpendicular across the longitudinal axis.

According to another aspect of the invention, a plurality of straps are attached to the support.

According to another aspect of the invention, the support has an expanded condition and a stored condition. The support extends adjacent the back of the vehicle seat and the at least one strap extends around the occupant and the back of the seat when the support is in the expanded condition. The support and the at least one strap are stored in a housing when in the stored condition. The housing is connected to a roof of the vehicle.

According to another aspect of the invention, the support extends along a longitudinal axis from a first end to a second end. The first end is located adjacent the back of the vehicle seat when the support is in the expanded condition and the second end is connected to at least one of the housing and the roof of the vehicle.

BRIEF DESCRIPTION OF THE DRAWINGS

Embodiments of the invention will now be described by way of example only, with reference to the accompanying drawings, in which.

DETAILED DESCRIPTION

Figure 1:
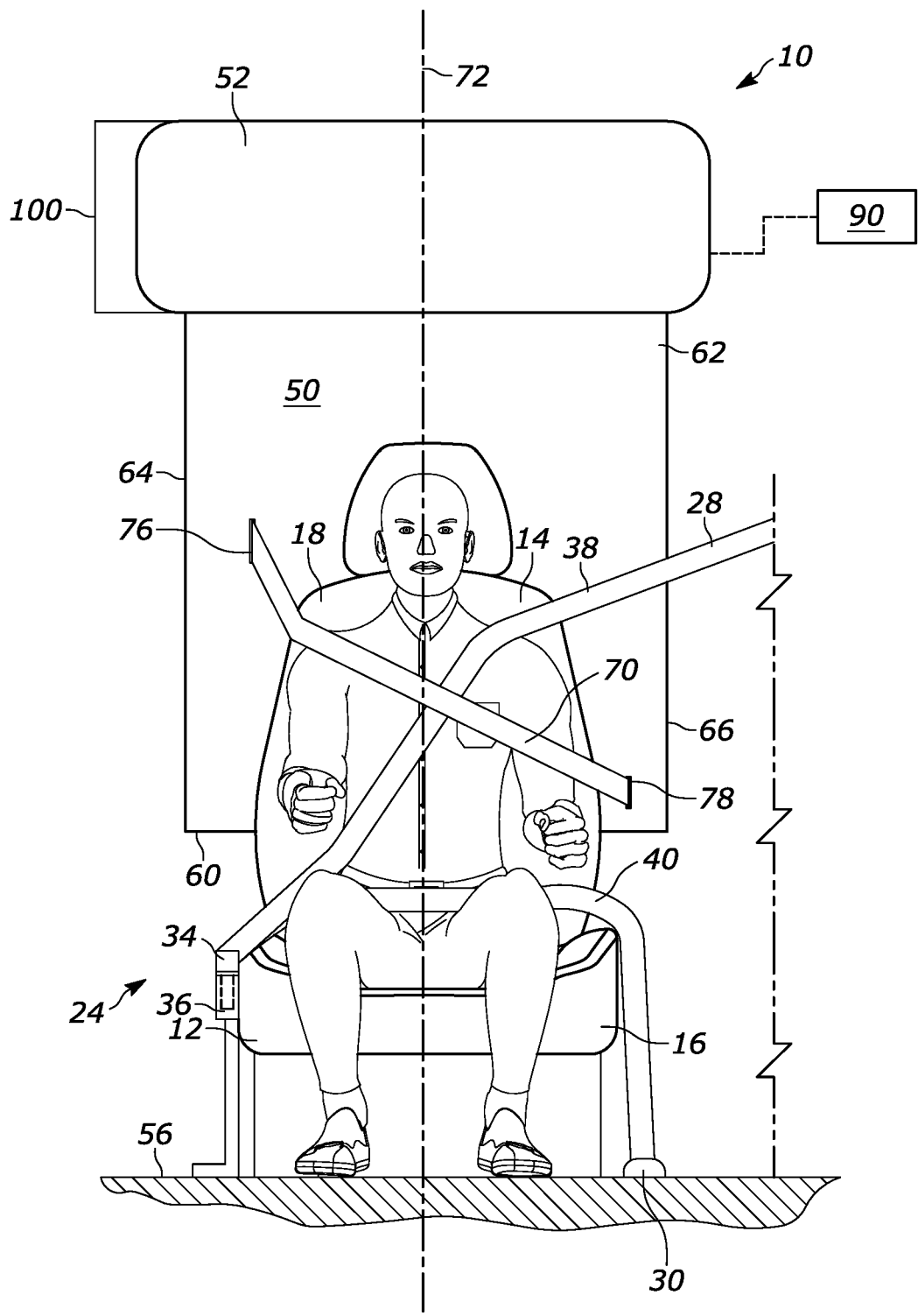
FIG. 1 is a schematic front view of an occupant restraint system according to a first example of the invention.
Figure 2:
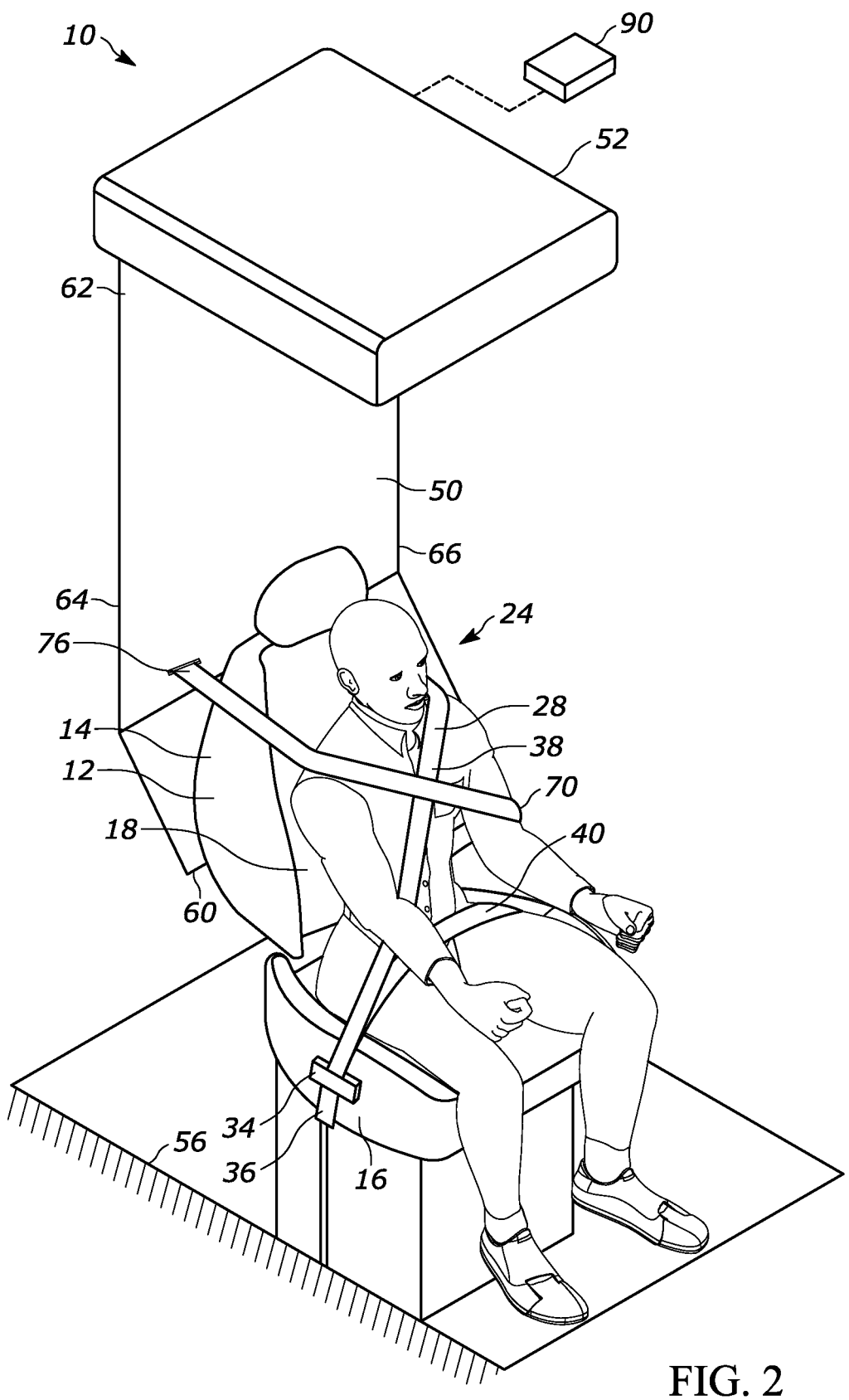
FIG. 2 is a schematic pictorial view of the occupant restraint system of FIG. 1.
Figure 3:
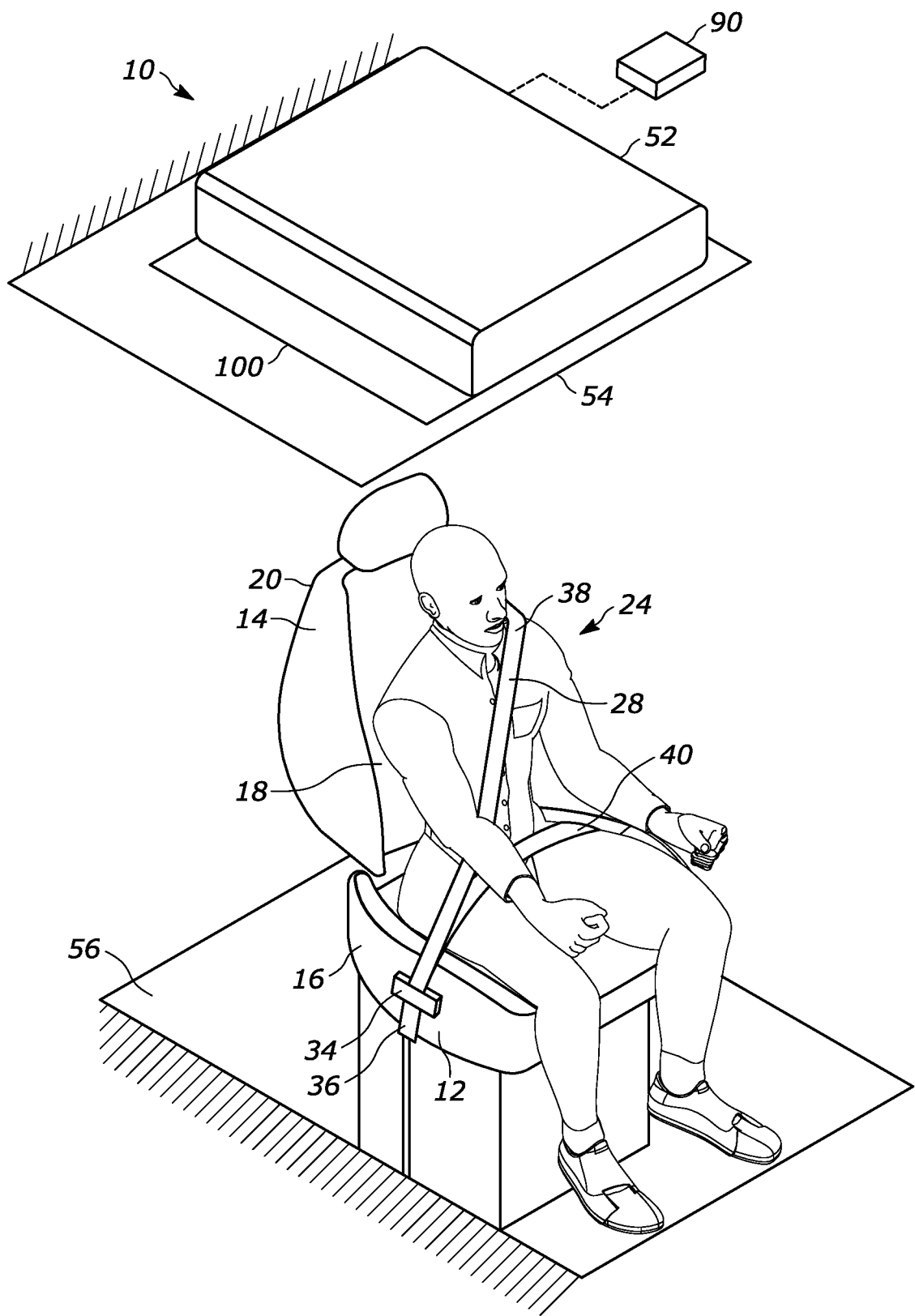
FIG. 3 is a schematic pictorial view of the occupant restraint system of FIGS. 1-2 in a stored condition.

An occupant restraint system 10 according to a first example of the invention is shown in FIGS. 1-3. The occupant restraint system 10 may be used to restrain an occupant in a vehicle seat 12. The seat 12 includes a back 14 and a seat cushion 16. The back 14 extends from the seat cushion 16 and includes a first side 18 facing a vehicle occupant. A second opposite side 20 (FIG. 3) of the back 14 faces away from the occupant. The occupant sits on the seat cushion 16 and may lean against the first side 18 of the back 14.

The occupant restraint system 10 (FIG. 1) may be used in conjunction with a known seatbelt system 24. The know seatbelt system 24 may be a 3-point seat belt system having webbing 28 with a first end connected to the vehicle by an anchor 30 and a second end connected to a belt retractor, as known in the art. The webbing 28 may extend from the retractor, through a D-ring and through a latch plate 34 that is inserted into a buckle 36, as known in the art. When the latch plate 34 is fastened to the buckle 36, the webbing 28 has a shoulder belt section 38 that extends across the occupant's torso and a lap belt section 40 that extends across the occupant's pelvis.

The occupant restraint system 10 (FIGS. 1-2) includes a support member 50. The support member 50 may extend from a housing 52 connected to the vehicle roof 54 when in an expanded position. The support member 50 may be stored in the housing 52 when in a stored condition, as shown in FIG. 3. The support member 50 may be secured to the housing 52 and/or the roof 54 of the vehicle to which the housing 52 is attached. The support member 50 may be a substantially rectangular fabric panel. The support member 50 can, however, be any desired shape and manufactured out of any desired material.

The support 50 (FIGS. 1-2) has a first or lower end 60 and a second or upper end 62. The first end 60 extends adjacent the vehicle seat 12 when the occupant restraint system 10 is in an expanded position, shown in FIGS. 1-2. The second end 62 is attached to the housing 52 and/or the roof 54. First and second sides 64, 66 extend between the first end 60 and the second end 62.

At least one strap 70 (FIG. 1) is attached to the support 50. The strap 70 extends transverse to a longitudinal axis 72 of the support 50. A first end 76 of the strap 70 may be attached to the support 50 adjacent the first side 64 approximately midway between the first end 60 and the second end 62 of the support 50. A second end 78 of the strap 70 may be attached to the support member 50 adjacent the second side 66 and the first end 60 of the support member 50. The strap 70 may be similar to seat belt webbing with the first and second ends 76,78 stitched to the support. The strap 70 may be made of any desired material and connected to the support 50 in any desired manner.

A sensor 90 (FIGS. 1-3) for sensing an event in which occupant protection is desired, such as a sudden deceleration of the vehicle may be connected to the housing 52. The support 50 may be moved from the stored condition shown in FIG. 3 to the expanded condition shown in FIGS. 1-2 upon the sensor 90 sensing an event in which occupant protection is desired. The occupant restraint system 10 can optionally include a deployment mechanism 100 (shown schematically) for assisting in deployment of the support 50. In one example, the deployment mechanism 100 may be a compressed gas system that is configured to forcefully eject the support 50 from the housing 52 away from the vehicle roof 54 and toward a vehicle floor 56. It is contemplated that any desired deployment mechanism may be used.

In the stored condition (FIG. 3), the support 50 and the strap 70 are stored in the housing 52. The support 50 and strap 70 may be stored in a folded or rolled condition in the housing 52. When the sensor 90 senses an event for which occupant protection is desired, the support 50 is moved from the stored condition to the expanded position. The deployment mechanism 100 may eject the support 50 from the housing 52 such that the first end 60 of the support moves away from the vehicle roof 54. The strap 70, which is attached to the support 50, is likewise ejected from the housing 52.

The support 50 extends adjacent the second side 20 of the back 14 of the seat 12 when in the expanded position, as shown in FIGS. 1-2. The strap 70 extends around the occupant of the seat 12 adjacent the first side 18 of the back 14 when the occupant restraint system 10 is in the expanded position. The strap 70 extends across the occupant between the occupant's right shoulder and left hip. Therefore, the back 14 and the occupant of the seat are located between the strap 70 and the support 50 when the occupant restraint system 10 is in the expanded condition.

As the event that triggered deployment of the occupant restraint system 10 advances, the occupant may tend to move away from the back 14 of the seat 12. However, such movement is restrained by the known seatbelt system 24 as is known in the art. The occupant restraint system 10 further restrains movement of the occupant. Specifically, if the occupant moves away from the back 14 of the seat 12, the occupant will engage the strap 70. This may initially cause to the strap 70 to move away from the back 14 of the seat 12 with the occupant, which in turn will cause like movement of the support 50. However, movement of the support 50 will ultimately be terminated once the support 50 engages the second side 20 of the back 14 to provide additional occupant restraint. The occupant restraint system 10, in combination with the known seatbelt system 24, provides increased occupant restraint similar to that afforded by a 5-point seatbelt system without sacrificing the comfort and convenience of a 3-point seatbelt system.

Figure 4:
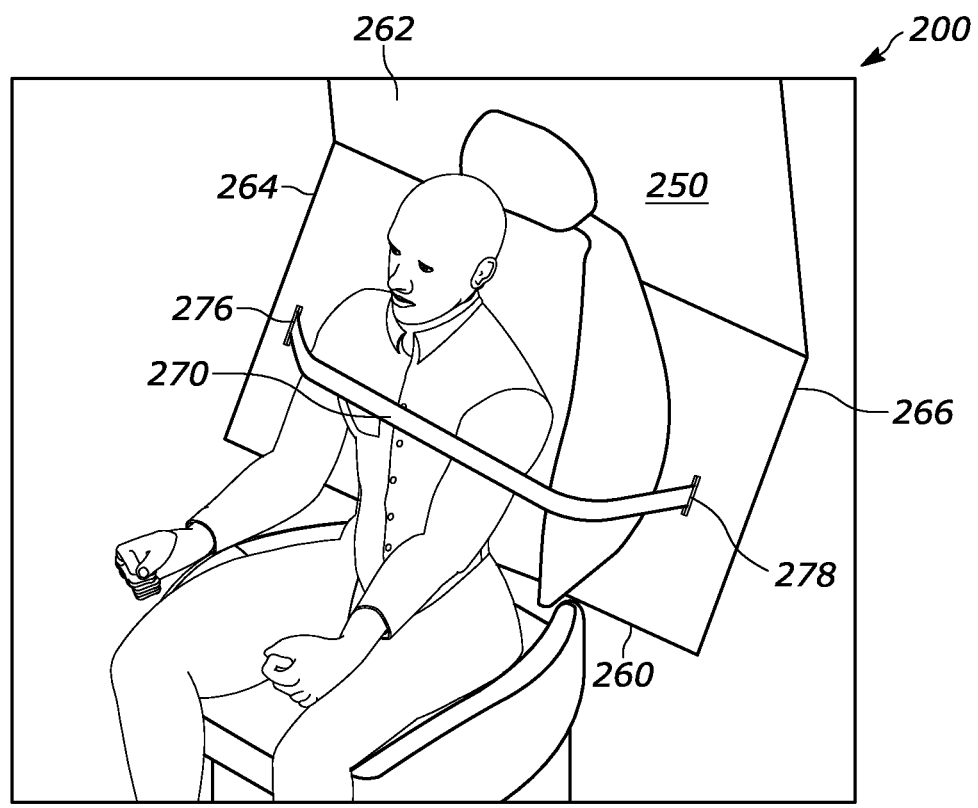
FIG. 4 is a schematic perspective view of an occupant restraint system according to another example of the invention.

An occupant restraint system 200 according to another example of the invention is shown in FIG. 4. The construction and operation of the occupant restraint system 200 shown in FIG. 4 is similar to the occupant restraint system 10 shown in FIGS. 1-3. Thus, only the differences between the two systems will be described in detail.

The occupant restraint system 200 of FIG. 4 includes a support 250 that has a first or lower end 260 and a second or upper end 262. First and second sides 264, 266 extend between the first end 260 and the second end 262.

At least one strap 270 is attached to the support 250. The strap 270 includes a first end 276 and a second end 278. The strap 270 extends generally perpendicular to a longitudinal axis of the support 250. The first end 276 of the strap 270 is attached adjacent the first side 264 of the support 250 approximately midway between the first end 260 and the second end 262. The second end 278 of the strap 270 is attached adjacent the second side 266 of the support 250 approximately midway between the first end 260 and the second end 262. The occupant restraint system 200 of FIG. 4 is dimensioned and configured such that, in the expanded condition, the strap 270 extends across the occupant's chest. However, the occupant restraint system 200 may be configured so that the strap 270 extends across any desired part of the occupant when in the expanded condition.

Figure 5:
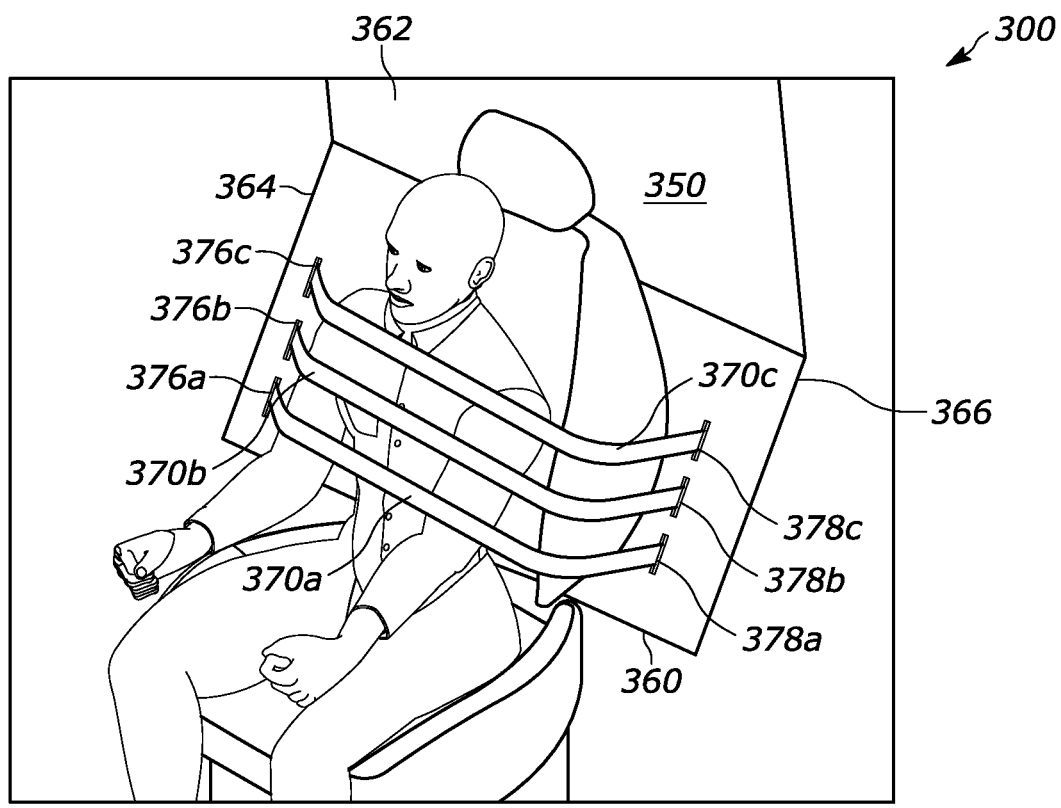
FIG. 5 is a schematic perspective view of an occupant restraint system according to another example of the invention.

An occupant restraint system 300 according to another example of the invention is shown in FIG. 5. The construction and operation of the occupant restraint system 300 shown in FIG. 5 is similar to the occupant restraint system shown in FIGS. 1-3. Thus, only the differences between the two systems will be described.

The occupant restraint system 300 of FIG. 5 includes a support 350 that has a first or lower end 360 and a second or upper end 362. First and second sides 364, 366 extend between the first end 360 and the second end 366.

Three straps 370a, 370b, 370c are attached to the support 350. Each strap 370a, 370b, 370c includes a first end 376a, 376b, 376c and a second end 378a, 378b, 378c, respectively. Each of the straps 370a, 370b, 370c extends perpendicular to a longitudinal axis of the support 350 and generally parallel to each other. The first end 376a, 376b, 376c of each strap 370a, 370b, 370c is attached adjacent the first side 364 of the support 350. The second end 378a, 378b, 378c of each strap 370a, 370b, 370c is attached adjacent the second side 366. The straps 370a, 370b, 370c are spaced apart from each other along the longitudinal axis of the support 350. The occupant restraint system 300 of FIG. 5 is dimensioned and configured such that the first strap 370a extends across the occupant's abdomen, the second strap 370b extends across the occupant's chest, and the third strap 370c extends across the occupant's shoulders. However, the occupant restraint system 300 may be configured so that the straps 370a, 370b and 370c extend across any desired areas of the occupant when in the expanded condition.

What have been described above are examples of the disclosure. It is, of course, not possible to describe every conceivable combination of components or method for purposes of describing the disclosure, but one of ordinary skill in the art will recognize that many further combinations, permutations, and variations of the disclosure are possible. For example, the various aspects of the occupant restraint system show an occupant seated on the left-hand side of the vehicle (i.e., the left side of the vehicle when the vehicle is traveling forward). One having ordinary skill in the art will understand that the arrangement of the 3-point seatbelt arrangement and/or the occupant restraint system may have to be modified for an occupant seated on the right-hand side of the vehicle. Furthermore, one having ordinary skill in the art will understand that the occupant restraint system may have any desired number of straps attached at different locations of a support to provide desired occupant restraint. Accordingly, the disclosure is intended to embrace all such alterations, modifications, and variations that fall within the scope of this application, including the appended claims.

The invention claimed is:

1. An occupant restraint system for retaining an occupant in a vehicle seat comprising:
   a support extending adjacent a back of the vehicle seat so that the back of the vehicle seat extends between an occupant position and the support, the support being movable relative to the vehicle seat from a stored condition spaced from the back of the vehicle seat to adjacent the back of the vehicle seat; and
   at least one strap having first and second ends attached to the support, the at least one strap extending around the occupant position and the back of the seat so that the back of the vehicle seat and the occupant position are between the support and the at least one strap.

2. The occupant restraint system as set forth in claim 1, wherein the support extends along a longitudinal axis from a first end to a second end, the at least one strap extending diagonally to the longitudinal axis.

3. The occupant restraint system as set forth in claim 1, wherein the support extends along a longitudinal axis from a first end to a second end, the at least one strap extending perpendicular across the longitudinal axis.

4. The occupant restraint system as set forth in claim 1, including a plurality of straps attached to the support.

5. The occupant restraint system as set forth in claim 1, wherein the at least one strap is configured to extend across the occupant between the occupant's shoulder and hip.

6. The occupant restraint system as set forth in claim 1, wherein the at least one strap is configured to extend across at least one of the occupant's abdomen, chest, and shoulders.

7. The occupant restraint system as set forth in claim 1, wherein the support has an expanded condition and a stored condition, the support extending adjacent the back of the vehicle seat and the at least one strap extending around the occupant and the back of the seat when the support is in the expanded condition, the support and the at least one strap being stored in a housing when in the stored condition, the housing being connected to a roof of the vehicle.

8. The occupant restraint system as set forth in claim 7, further including a deployment mechanism that ejects the support from the housing such that the first end of the support moves away from the vehicle roof.

9. The occupant restraint system as set forth in claim 7, wherein the support extends along a longitudinal axis from a first end to a second end, the first end being located adjacent the back of the vehicle seat when the support is in the expanded condition and the second end being connected to at least one of the housing and the roof of the vehicle.

10. The occupant restraint system as set forth in claim 1, wherein the support extends along a longitudinal axis from a first end to a second end, the first and second ends of the at least one strap being fixedly attached on opposite sides of the longitudinal axis of the support.

11. The occupant restraint system as set forth in claim 1, wherein the support is a fabric panel.

12. The occupant restraint system as set forth in claim 1, wherein a first end of the support moves away from a roof of the vehicle as the support moves relative to the vehicle seat from a stored condition to adjacent the back of the vehicle seat.

13. The occupant restraint system as set forth in claim 1, wherein the support and the at least one strap are in a folded or rolled condition when the support is in the stored condition.

14. The occupant restraint system as set forth in claim 1, wherein the first and second ends of the at least one strap are stitched to the support.

15. The occupant restraint system as set forth in claim 1, wherein the at least one strap moves with the support as the support moves from the stored condition to adjacent the back of the vehicle seat.

* * * * *